United States Patent
Wesolkowski et al.

[19]

[11] Patent Number: 5,963,669
[45] Date of Patent: Oct. 5, 1999

[54] METHOD OF EXTRACTING RELEVANT CHARACTER INFORMATION FROM GRAY SCALE IMAGE DATA FOR CHARACTER RECOGNITION

[75] Inventors: Slawomir B. Wesolkowski; Khaled S. Hassanein, both of Waterloo; Raymond L. Higgins, Kitchener, all of Canada

[73] Assignee: NCR Corporation, Dayton, Ohio

[21] Appl. No.: 08/778,342

[22] Filed: Jan. 2, 1997

[51] Int. Cl.⁶ .................................................. G06K 9/52
[52] U.S. Cl. .................... 382/206; 358/466; 382/137; 382/272; 382/195
[58] Field of Search ................... 382/137, 270, 382/271, 272, 273, 187, 195, 206; 358/465, 466

[56] References Cited

U.S. PATENT DOCUMENTS

| | | | |
|---|---|---|---|
| 4,888,812 | 12/1989 | Dinan et al. | 382/140 |
| 4,903,316 | 2/1990 | Hongo et al. | 382/272 |
| 5,018,218 | 5/1991 | Peregrim et al. | 382/272 |
| 5,113,454 | 5/1992 | Marcantonio et al. | 382/272 |
| 5,157,740 | 10/1992 | Klein et al. | 382/272 |
| 5,208,869 | 5/1993 | Holt | 382/138 |
| 5,577,135 | 11/1996 | Grajski et al. | 382/187 |
| 5,734,747 | 3/1998 | Vaidyanathan | 382/270 |

OTHER PUBLICATIONS

Mohamed Kamel et al., "Extraction of Binary Character/Graphics Images from Grayscale Document Images", *CVGIP: Graphical Models and Image Processing*, vol. 55, No. 3, May 1993, pp. 203–217, 1993.

Øivind Due Trier et al., "Evaluation of Binarization Methods for Document Images", *IEEE Transactions on Pattern Analysis and Machine Intelligence*, vol. 17, No. 3, Mar. 1995, pp. 312–315.

Primary Examiner—Jon Chang
Assistant Examiner—Gilberto Frederick, II
Attorney, Agent, or Firm—Michael Chan

[57] ABSTRACT

A method of processing a matrix of gray scale picture elements derived from lifting an image of a document to extract strokes from the image of the document comprises the steps of (a) calculating a global average value of the gray scale picture elements, (b) placing a window over a portion of the matrix of gray scale picture elements, (c) calculating a local average value of the gray scale picture elements contained in the window of step (b), (d) comparing the global average value of step (a) with the local average value of step (c), (e) calculating a relative figure of importance (RFI) value for each gray scale picture element contained in the window of step (b) when the local average value calculated in step (c) is less than the global average value calculated in step (a), (f) increasing the size of the window of step (b) and replacing the window of step (b) with this increased sized window when the local average value calculated in step (c) is greater than the global average value calculated in step (a), and (g) repeating step (b), (c), (d), (e), and (f) using the increased sized window obtained in step (f) until the local average value calculated in (c) is less than the global average value.

10 Claims, 3 Drawing Sheets

METHOD OF EXTRACTING RELEVANT CHARACTER INFORMATION FROM GRAY SCALE IMAGE DATA FOR CHARACTER RECOGNITION

BACKGROUND OF THE INVENTION

The present invention relates to extraction of character information for character recognition, and is particularly directed to a method of extracting relevant character information from fields of gray scale image data obtained from scanning a bank document such as a check.

In the banking industry, a check may contain machine-printed or handwritten data in the "courtesy" amount field of the check. In a continuing trend to automate banking operations, efforts have been made to machine read the courtesy amount of the check. The machine-printed or handwritten courtesy amount needs to be extracted prior to being subjected to character recognition at a subsequent operation.

To extract the relevant character information from the courtesy amount field of the check, the check is typically moved past a scanning device to obtain a digitized image of the check. More specifically, as the check moves past the scanner device, the scanner device generates successive scan lines of pixels to produce a matrix of pixels associated with the check. Each pixel may have a particular gray level associated therewith. For example, a pixel may have any one of 256 gray levels associated therewith, ranging from completely black (level zero) to completely white (level 255).

A number of character extraction schemes is known. One character extraction scheme includes a binarization method which attempts to de-emphasize unimportant pixels (noise for example). It is important to use a quality extraction scheme when a high performance optical character recognition (OCR) system is used to further process the check. If a character in the courtesy amount field is not extracted properly, the character recognition engine which later acts on the extracted character information may perform poorly.

SUMMARY OF THE INVENTION

In accordance with one aspect of the present invention, a method of processing a matrix of gray scale picture elements derived from lifting an image of a document to extract strokes from the image of the document comprises the steps of (a) calculating a global average value of the gray scale picture elements, (b) placing a window over a portion of the matrix of gray scale picture elements, (c) calculating a local average value of the gray scale picture elements contained in the window of step (b), (d) comparing the global average value of step (a) with the local average value of step (c), and (e) calculating a relative figure of importance (RFI) value for each gray scale picture element contained in the window of step (b) based upon the comparison of step (d). Preferably, each gray scale picture element is compared with the local average value to calculate the respective RFI value when the local average value calculated in step (c) is less than the global average value calculated in step (a). The RFI value of each gray scale picture element of the matrix of gray scale picture elements is compared with a global threshold value. Each gray scale picture element having an RFI value greater than the global threshold value is kept. Each gray scale picture element having an RFI value less than the global threshold value is deleted.

In accordance with another aspect of the present invention, a method of processing a matrix of gray scale picture elements derived from lifting an image of a document to extract strokes from the image of the document comprises the steps of (a) calculating a global average value of the gray scale picture elements, (b) placing a window over a portion of the matrix of gray scale picture elements, (c) calculating a local average value of the gray scale picture elements contained in the window of step (b), (d) comparing the global average value of step (a) with the local average value of step (c), (e) calculating a relative figure of importance (RFI) value for each gray scale picture element contained in the window of step (b) when the local average value calculated in step (c) is less than the global average value calculated in step (a), (f) increasing the size of the window of step (b) and replacing the window of step (b) with this increased sized window when the local average value calculated in step (c) is greater than the global average value calculated in step (a), and (g) repeating step (b), (c), (d), (e), and (f) using the increased sized window obtained in step (f) until the local average value calculated in (c) is less than the global average value.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

The present invention is directed to a method of extracting relevant character information from fields of gray scale image data obtained from scanning a document. The document may be of any type. By way of example, a document in the form of a bank check is processed in accordance with the present invention.

Figure 1:
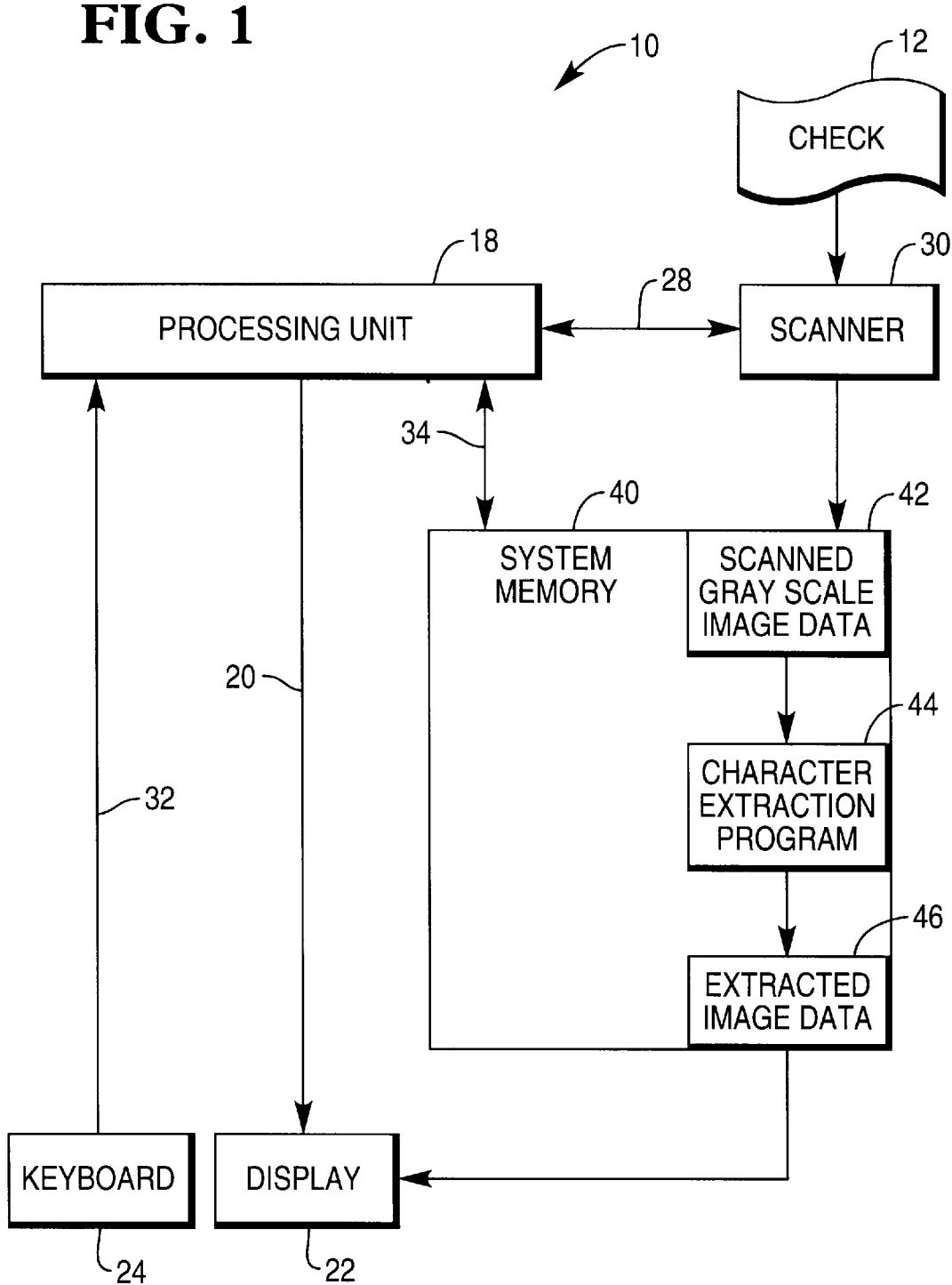
FIG. 1 is a block diagram representation of a system embodying the present invention.

Referring to FIG. 1, a check processing system 10 includes a processing unit 18 which is electrically connected via bus line 20 to a display 22. The processing unit 18 is electrically connected via bus line 32 to a keyboard 24 and via bus line 34 to a system memory 40. The system memory 40 includes memory space which stores, inter alia, a number of application programs, scanned gray scale image data, and extracted image data.

The check processing system 10 further includes a scanner device 30 which is electrically connected via bus line 28 to the processing unit 18. During operation, the scanner device 30 lifts an image of a check 12 when the check is moved past the scanner device. The scanner device 30 produces pixels each pixel having a particular gray level associated therewith. The gray level of the pixel is stored as gray scale image data 42 in the system memory 40 as shown in FIG. 1. The process of lifting an image of the check 12 and storing the image as gray scale image data 42 in system memory 40 is known and, therefore, will not be described.

The application programs stored in the system memory 40 include a character extraction program 44 which processes the gray scale image data 42 in accordance with the present invention. The character extraction program 44 is executed to extract relevant character information from a number of fields of the check 12, such as the courtesy amount field of the check. In particular, the character extraction program 44 is used to extract relevant character information from a machine-printed or handwritten amount in the courtesy amount field of the check 12. For simplicity, only the case in which the courtesy amount field contains handwritten data will be described in detail.

The processing unit 18 receives data via bus line 28 from the scanner device 30 and reads the gray scale image data 42 stored in the system memory 40. The processing unit 18 processes this data in accordance with the character extraction program 44 stored in the system memory 40 to produce extracted image data 46 which is also stored in the system memory 40. Preferably, the processing unit 18 is a microcomputer, and the system 40 is a random access type of memory. Suitable microcomputers and memories are readily available in the marketplace. Their structure and operation are well known and, therefore, will not be described.

Figure 2:
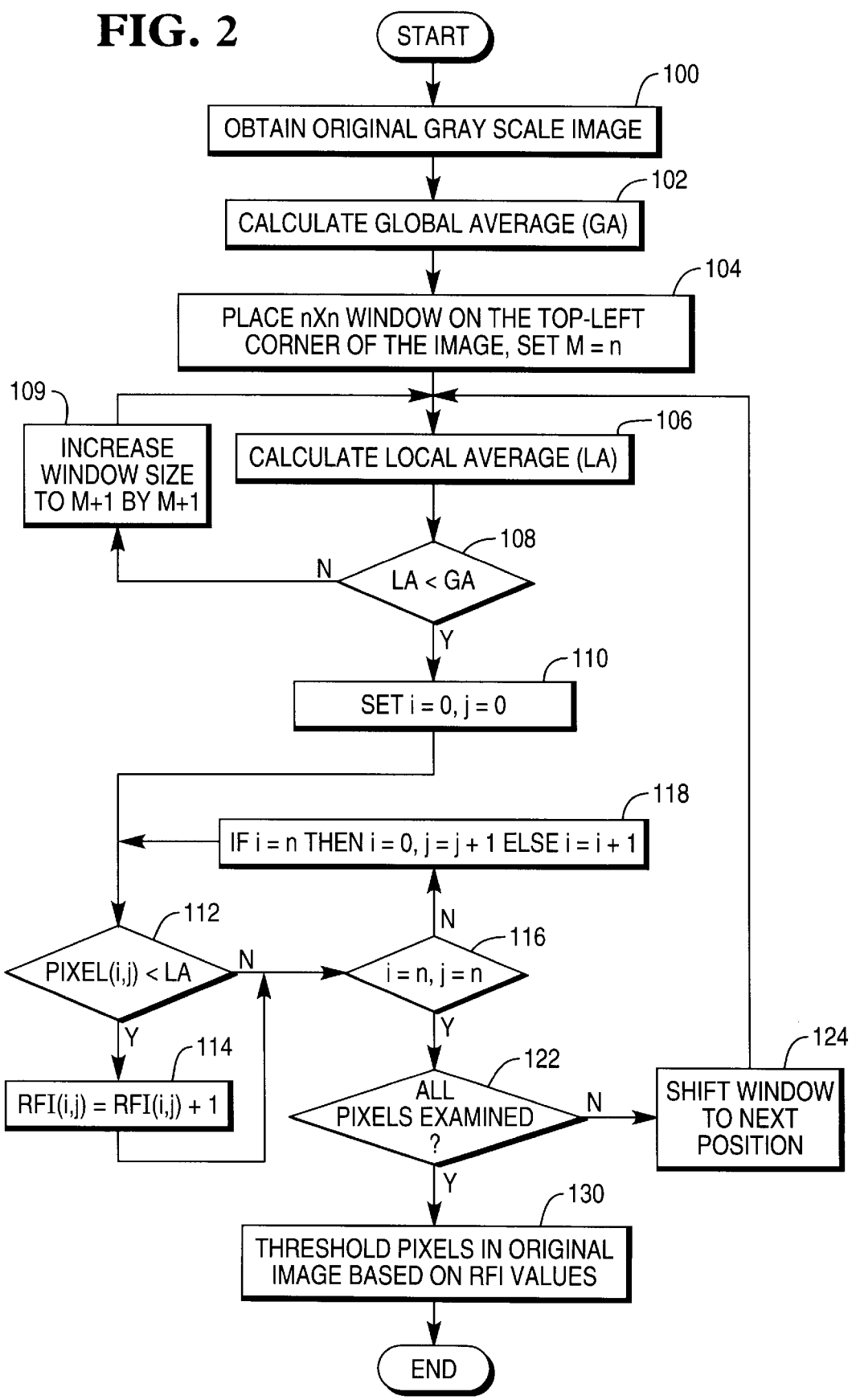
FIG. 2 is a flowchart depicting a process carried out by the system of FIG. 1 in accordance with the present invention.
Figure 3:
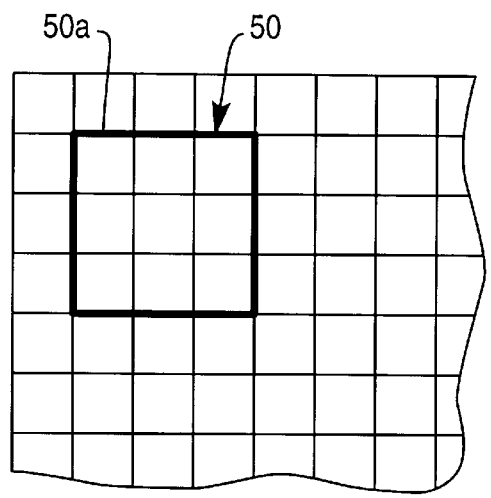
FIG. 3 is a diagram of a window of a predetermined size placed over certain pixels.

Referring to FIG. 2, a flowchart depicts steps of the character extraction program 44. As shown in step 100, the scanner device 30 scans the check 12 and produces gray scale image data 42 which is stored in the system memory 40. The program 44 proceeds to step 102 in which a global average of all of the pixels of the gray scale image data 42 is calculated. The global average value is designated as the "GA" value. The program 44 then proceeds to step 104 in which a window 50 (FIG. 3) having size "n by n" is located at the top-left corner of the gray scale image data 42. At the same time, a variable "M" is set equal to the value of "n". For example, the size of the window 50 could be 3-by-3, as shown and specifically designated "50a" in FIG. 3. Accordingly, the variable "M" is set to 3.

Figure 4:
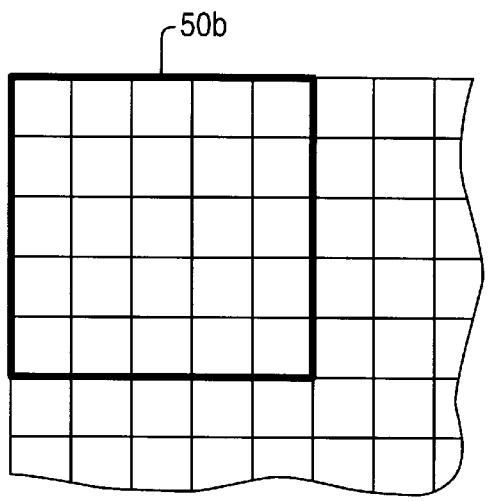
FIG. 4 is a diagram similar to FIG. 3 and showing a larger window placed over additional pixels.

The program 44 then proceeds to step 106 in which only the pixels contained within the window 50a are averaged to obtain a local average. The local average value is designated as the "LA" value. In step 108, the LA and GA values are compared with each other. If the comparison in step 108 is such that the LA value is greater than the GA value, then the program 44 proceeds to step 109 in which the size window 50a is increased to "n+1 by n+1", i.e., from the size shown in FIG. 3 to the size shown in FIG. 4. The result is a window 50b having a larger size of 4-by-4 as shown in FIG. 4. A new LA value based upon the 4-by-4 window 50b is then calculated in step 106.

If the comparison in step 108 is such that the LA value is still greater than the GA value, then the program 44 loops back through steps 109 and 106 as just described. The size of the window can be increased indefinitely in this manner. However, for computational efficiency, a limit on the size should be selected. Preferably, the size of the window is limited to 15-by-15. If the size limit of the window is reached in step 109, then the GA value is substituted in place of the LA value for comparison purposes in later steps following step 108.

If the comparison in step 108 is such that the LA value is less than the GA value, then the program 44 proceeds to step 110 in which two index numbers "i" and "j" are both initialized to zero. The program 44 then proceeds to step 112 in which a determination is made as to whether a pixel contained within the window 50a and associated with the index numbers "i" and "j" is less than the LA value. If the determination in step 112 is negative, then the program 44 proceeds directly to step 116. However, if the determination in step 112 is affirmative, then a relative figure of importance value, designated as the "RFI" value associated with that particular pixel is incremented by one before proceeding to step 116.

When the program 44 reaches step 116, the program loops back through step 118 and previous steps 112 and 114 until all of the pixels contained within the window 50a have been processed in the manner just described. With regard to the instruction contained in step 118, the two index numbers "i" and "j" are being incremented to cover all of the pixels contained within the window 50a shown in FIG. 3. When all of the pixels contained in the window 50a have been processed, the determination in step 116 becomes affirmative and the program 44 proceeds to step 122.

Figure 5:
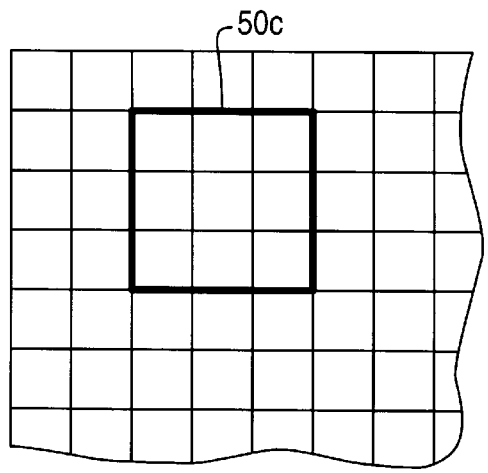
FIG. 5 is a diagram similar to the diagram of FIG. 3 and showing the window over different pixels.

In step 122, a determination is made as to whether all of the pixels associated with the entire gray scale image data 42 have been processed. If the determination in step 122 is negative, the program 44 proceeds to step 124 in which the window 50a is shifted from the original position shown in FIG. 3 to the next position shown in FIG. 5. The program 44 then loops back to step 106 to repeat the process (which process was previously applied to all of the pixels contained in the original window 50a shown in FIG. 3) for all of the pixels contained in the new window 50c shown in FIG. 5. This process of shifting the window is continued until all of the pixels in the entire gray scale data 42 has been processed.

When all of the pixels in the entire gray scale data 42 are processed, the determination in step 122 becomes affirmative. When this occurs, the program 44 proceeds to step 130 in which the value of each of the pixels contained in the original gray scale data 42 is thresholded with the respective RFI value as calculated by the above-described process.

It should be apparent that an RFI value is calculated for each pixel in the original image data. The RFI value of each pixel indicates the relative importance of that particular pixel relative to its neighboring pixels. Specifically, the importance of each pixel is determined by exhaustively comparing the contrast (value) of the pixel with the local average value of each window that pixel falls within. Accordingly, a more accurate and precise determination is made about the relative importance of that particular pixel.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing a matrix of gray scale picture elements derived from lifting an image of a document to extract strokes from the image of the document, the method comprising the steps of:

(a) calculating a global average value of the gray scale picture elements;

(b) placing a window over a portion of the matrix of gray scale picture elements;

(c) calculating a local average value of the gray scale picture elements contained in the window of step (b);

(d) comparing the global average value of step (a) with the local average value of step (c); and (e) calculating a relative figure of importance (RFI) value for each gray scale picture element contained in the window of step (b) based upon the comparison of step (d) such that the RFI value is indicative of the relative importance of that particular pixel relative to its neighboring pixels.

2. A method according to claim 1, wherein step (e) includes the steps of:

(e-1) comparing each gray scale picture element with the local average value to calculate the respective RFI value when the local average value calculated in step (c) is less than the global average value calculated in step (a).

3. A method according to claim 2, further comprising the step of:

(f) comparing the RFI value of each gray scale picture element of the matrix of gray scale picture elements with a global threshold value.

4. A method according to claim 3, further comprising the steps of:

(g) keeping each gray scale picture element having an RFI value greater than the global threshold value; and (h) deleting each gray scale picture element having an RFI value less than the global threshold value.

5. A method of processing a matrix of gray scale picture elements derived from lifting an image of a document to extract strokes from the image of the document, the method comprising the steps of:

(a) calculating a global average value of the gray scale picture elements;

(b) placing a window over a portion of the matrix of gray scale picture elements;

(c) calculating a local average value of the gray scale picture elements contained in the window of step (b);

(d) comparing the global average value of step (a) with the local average value of step (c);

(e) calculating a relative figure of importance (RFI) value for each gray scale picture element contained in the window of step (b) when the local average value calculated in step (c) is less than the global average value calculated in step (a) such that the RFI value is indicative of the relative importance of that particular pixel relative to its neighboring pixels;

(f) increasing the size of the window of step (b) and replacing the window of step (b) with this increased sized window when the local average value calculated in step (c) is greater than the global average value calculated in step (a); and (g) repeating step (b), (c), (d), (e), and (f) using the increased sized window obtained in step (f) until the local average value calculated in (c) is less than the global average value.

6. A method according to claim 5 wherein step (e) includes the steps of:

(e-1) comparing each gray scale picture element with the local average value to calculate the respective RFI value when the local average value calculated in step (c) is less than the global average value calculated in step (a).

7. A method according to claim 6, further comprising the step of:

(h) comparing the RFI value of each gray scale picture element of the matrix of gray scale picture elements with a global threshold value.

8. A method according to claim 7, further comprising the steps of:

(i) keeping each gray scale picture element having an RFI value greater than the global threshold value; and (j) deleting each gray scale picture element having an RFI value less than the global threshold value.

9. An apparatus comprising:

a memory;

a scanner device for (i) lifting an image of a document, and (ii) storing the image as a matrix of gray scale picture elements in the memory; and means for (i) calculating a global average value of the gray scale picture elements, (ii) placing a window over a portion of the matrix of gray scale picture elements, (iii) calculating a local average value of the gray scale picture elements contained in the window, (iv) comparing the global average value with the local average value, and (v) calculating a relative figure of importance (RFI) value for each gray scale picture element contained in the window based upon the comparison of the global average value with the local average value, the RFI value being indicative of the relative importance of that particular pixel relative to its neighboring pixels.

10. An apparatus according to claim 9, wherein each gray scale picture element is compared with the local average value to calculate the respective RFI value when the local average value is less than the global average value.

* * * * *